May 19, 1925.  1,538,155
L. J. BARWOOD
PADDED WASHER
Filed Nov. 5, 1923
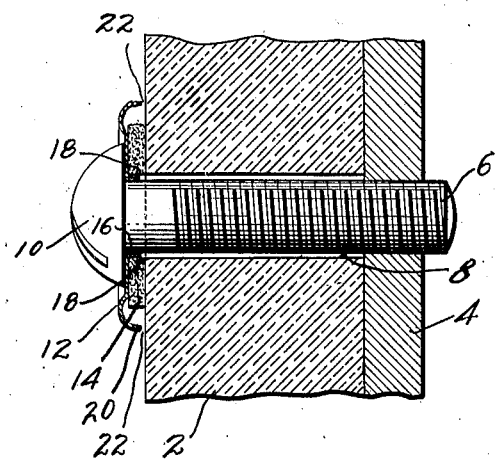
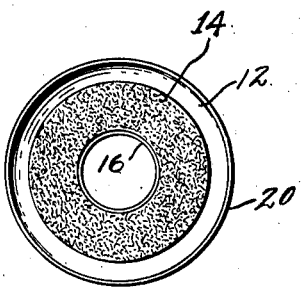
Inventor
L. J. Barwood
by David Rines
Attorney Patented May 19, 1925.

1,538,155

UNITED STATES PATENT OFFICE.

LEON J. BARWOOD, OF BROOKLINE, MASSACHUSETTS.

PADDED WASHER.

Application filed November 5, 1923. Serial No. 672,888.

*To all whom it may concern:*

Be it known that I, LEON J. BARWOOD, a citizen of the United States, and a resident of Brookline, in the county of Norfolk and Commonwealth of Massachusetts, have invented a new and useful Improvement in Padded Washers, of which the following is a specification.

The present invention relates to washers, and its chief object is to provide a unitary padded washer that shall be convenient to manipulate, cheap to manufacture, and efficient in operation.

The invention will be more fully explained in connection with the accompanying drawings, in which Fig. 1 is a cross section, showing a washer constructed according to a preferred embodiment of the present invention, secured in place upon an article in connection with which it is adapted to be used; and Fig. 2 is a rear elevation of the washer shown in Fig. 1.

It is common to secure fragile articles, like the glass article 2, to a frame 4, by means of bolts, screws, or other members 6 that extend through openings 8 in the article 2 and into the frame 4. Between the head 10 of the member 6 and the article 2, it is customary to insert a ring washer. As such washers are ordinarily made of metal, there is danger of breaking the fragile article 2. This is true not only when the article 2 is made of glass, but also when it is constituted of other fragile materials; and even when the article 2 is not fragile, there is danger of the metal washer scratching the paint, or cracking the enamel, or in some other way marring the surface of the article 2. To prevent this, a pad may be interposed between the washer and the article 2; but the use of both a washer and a pad requires the purchase of two things instead of one, increases the chance of losing one or the other, and involves great inconvenience in the handling, besides decreasing the efficiency of the joint.

According to the present invention, a single washer is employed, having all the advantages of ordinary single washers, but padded so as to prevent injury to the article 2. In the preferred embodiment of the invention that is herein illustrated and described, the washer comprises a metal ring element 12 and an asbestos ring element 14 secured together, side by side, in a unitary structure, so as to be capable of manipulation as a unit. It is not essential, however, that the element 12 be of metal, or the element 14 of asbestos, it is sufficient that the element 12 be of relatively hard material, so as to impart to the combined article the ordinary attributes of a washer, and that the element 14 be of relatively soft or yielding material, so as to act as a padding when in contact with the article 2.

The preferred method of securing the ring elements 12 and 14 is illustrated in Fig. 1, but other connections will readily suggest themselves to persons skilled in the art. According to the preferred construction, advantage is taken of the fact that the ring elements are provided with central openings through which the member 6 extends. The ring element 12 is therefore provided with a portion 16—shown as a flange—along its opening, and this portion 16 is caused to extend part way into the opening of the ring element 14. By having the portion 16 extend part way only into the opening of the ring element 14, it is assured that the metal of the ring element 12 shall not interfere with the above-described padding or cushioning effect of the ring element 14. The portion 16 is bent over, as shown at 18, so as to become embedded in the wall of the opening of the ring element 14. This results in a very rigid assembly of the ring elements 12 and 14.

It would mar the appearance to have the pad element 14 of the washer visible. The metal ring element 12 is therefore provided with a peripheral flange 20, as shown more particularly in Fig. 1. The flange 20 hides the element 14 when the washer is mounted upon the article 2. It would not do to have the flange 20 large enough to bind against the article 2, for the reasons already explained. The dimensions of the various parts are so chosen, therefore, as to leave a small gap 22 between the flange 20 and the article 2.

In accordance with the requirements of the statutes, a preferred embodiment of the invention has been illustrated and described herein, but it will be understood that the invention is not restricted to the illustrative embodiment.

What is claimed is:—

1. A padded ring washer comprising a ring element constituted of relatively hard material and a ring element constituted of relatively soft material rigidly assembled together side by side in a unitary structure so as to be manipulated as a unit, the relatively soft element being unconfined on its outer edge, the washer being adapted to be secured to an article with the free face of the relatively soft element in contact with the article by a member extending through the openings of the ring elements and into the article, the relatively soft material being yielding so as to be adapted to harmlessly engage the article so as to act as a padding, and the relatively hard element being positioned entirely to one side of the said free face so as not to engage the article.

2. A padded ring washer comprising a ring element constituted of relatively hard material and a ring element constituted of relatively soft material, the ring element constituted of relatively hard material having a portion along its opening extending part way only into the opening of the ring element constituted of relatively soft material and embedded in the wall of the said opening of the ring element constituted of relatively soft material, whereby the ring elements are rigidly assembled together side by side in a unitary structure so as to be manipulated as a unit.

3. A padded ring washer comprising a metal ring element and a non-metal ring element rigidly assembled together side by side in a unitary structure so as to be manipulated as a unit, the non-metal face of the washer being yieding and adapted to engage against an article upon which the washer is adapted to be mounted so as to act as a padding, the metal element being positioned entirely to one side of the said non-metal face so as not to engage against the article, and the washer being adapted to be secured to the article by a member extending through the openings of the ring elements and into the article.

4. A padded ring washer comprising a metal ring element and a fibrous ring element, the metal ring element having a portion along its opening extending part way only into the opening of the fibrous ring element and embedded in the wall of the said opening of the fibrous ring element, whereby the ring elements are rigidly connected together side by side in a unitary structure so as to be manipulated as a unit, the fibrous ring element being yielding and adapted to engage against an article upon which the washer is adapted to be mounted so as to act as a padding, the washer being adapted to be secured to the article by a member extending through the openings of the ring elements and into the article, and the metal ring element having a peripheral flange, whereby the fibrous ring element is adapted to be hidden by the flange when the washer is mounted upon the article.

In testimony whereof, I have hereunto subscribed my name this 3d day of November, 1923.

LEON J. BARWOOD.